US012423093B2

United States Patent
Hemadri et al.

(10) Patent No.: US 12,423,093 B2
(45) Date of Patent: Sep. 23, 2025

(54) TECHNIQUES FOR INCREMENTAL SOFTWARE BUILD

(71) Applicant: Cisco Technology, Inc., San Jose, CA (US)

(72) Inventors: Kalyana R Pavan Kumar Hemadri, San Jose, WA (US); Kalyan Ghosh, Saratoga, CA (US)

(73) Assignee: Cisco Technology, Inc., San Jose, CA (US)

( * ) Notice: Subject to any disclaimer, the term of this patent is extended or adjusted under 35 U.S.C. 154(b) by 175 days.

(21) Appl. No.: 18/305,992

(22) Filed: Apr. 24, 2023

(65) Prior Publication Data

US 2024/0354102 A1  Oct. 24, 2024

(51) Int. Cl.
*G06F 8/70* (2018.01)
*G06F 8/71* (2018.01)

(52) U.S. Cl.
CPC ...................... *G06F 8/71* (2013.01)

(58) Field of Classification Search
CPC ........................................................ G06F 8/71
See application file for complete search history.

(56) References Cited

U.S. PATENT DOCUMENTS

| | | |
|---|---|---|
| 11,550,568 B1 | 1/2023 | Wall |
| 12,118,350 B1 * | 10/2024 | Mukherjee ................ G06F 8/71 |
| 2007/0162441 A1 * | 7/2007 | Idicula .................. G06F 40/197 |
| | | 707/999.005 |
| 2012/0246617 A1 * | 9/2012 | Frontiero .................. G06F 8/71 |
| | | 717/122 |
| 2017/0344345 A1 * | 11/2017 | Fan .......................... G06F 8/71 |
| 2020/0233656 A1 | 7/2020 | Keyser |
| 2021/0099546 A1 | 4/2021 | Licata et al. |
| 2022/0050858 A1 | 2/2022 | Karr et al. |
| 2022/0236976 A1 | 7/2022 | Wiegley et al. |
| 2024/0289123 A1 * | 8/2024 | Chibon ..................... G06F 8/71 |

* cited by examiner

*Primary Examiner* — Hanh Thi-Minh Bui
(74) *Attorney, Agent, or Firm* — Lee & Hayes, P.C.

(57) ABSTRACT

Techniques for incrementally building a new version of a software application based on a cloud native distributed CI systems with snapshot of a past build for a qualified past version of the same software application are described herein. The techniques include receiving a first request to generate a first build unit for a first version of the software application and determining a first environment parameter associated with the request. A version history graph associated with the software application is also received, and based on this graph, a second version of the software application is determined. The techniques may further include generating the first build unit based on a distance measure associated with the first version and the second version. The techniques may also include determining the underlying external storage provisioner in Kubernetes base continuous integration systems and provision the snapshots by calling appropriate drivers.

20 Claims, 9 Drawing Sheets

500 ⤴

```
APIVERSION: V1
KIND: POD
METADATA:
  NAME: MY-POD          ← 502
504 → LABELS:
506 →   APP: MY-APP
SPEC:
  CONTAINERS:
  - NAME: MY-CONTAINER
    IMAGE: MY-IMAGE:LATEST
    PORTS:
    - CONTAINERPORT: 80
    ENV:
    - NAME: MY_VAR
      VALUE: "MY-VALUE"
508 → VOLUMES:
  - NAME: MY-VOLUME
    PERSISTENTVOLUMECLAIM:
      CLAIMNAME: MY-CLAIM
```

```
602 ⟶ AGENT:
         AGENT1:
         SNAPCI: ⟵ 604
           DRIVER: "ROOK-CEPH | LVM"
606 ⟶   KIND: K8S-KUSTOMIZE
         DEFAULTCONTAINER: "BUILD" ⟵ 608
610 ⟶   CUSTOMWORKSPACE: "/LOCAL/JENKINS/WS"
         CLOUD: "YAHOO" ⟵ 612
614 ⟶   OVERLAYS:
           BASES:
           - NAME: POD
           PATCHES:
           - NAME: MEDIUM
```

FIG. 6

TECHNIQUES FOR INCREMENTAL SOFTWARE BUILD

TECHNICAL FIELD

This invention relates generally to software application development and, more specifically, to techniques for incrementally building a new version of a software application based on a snapshot of a past build in a cloud native environment for a qualified past version of the same software application.

BACKGROUND

In the software development process, it is common for developers to make changes to the codebase of an application over time, resulting in new versions of the software. These changes can include updates to the code itself, changes to dependencies, or modifications to the build process. In some cases, developers may want to generate a new build of the application that is based on a previous build, but with some modifications. For example, a developer may want to generate a new build of an application that includes some new features or bug fixes, but is otherwise similar to a previous version of the application. However, generating a new build from scratch can be time-consuming and resource-intensive, especially for large applications with complex build processes for CI systems running on cloud native environments.

Furthermore, container orchestration systems like Kubernetes have become commonplace for managing and orchestrating containerized applications in cloud computing environments. Such systems provide highly scalable and flexible infrastructure for deploying, scaling, and managing applications in a distributed environment. However, building applications in such an environment can be challenging due to the complexity of managing multiple versions of the application and its dependencies across various environments. This challenge is exacerbated by the fact that applications are often deployed on a large scale and require frequent updates to maintain functionality and security. In addition, traditional build processes often rely on manual intervention, which can be time-consuming and error-prone. Therefore, there is a need for a more automated and efficient approach to building applications in cloud computing environments.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 5 provides an operational of a Kubernetes pod template.

FIG. 6 provides an operational example of a build environment template.

DESCRIPTION OF EXAMPLE EMBODIMENTS

Overview

Figure 1:
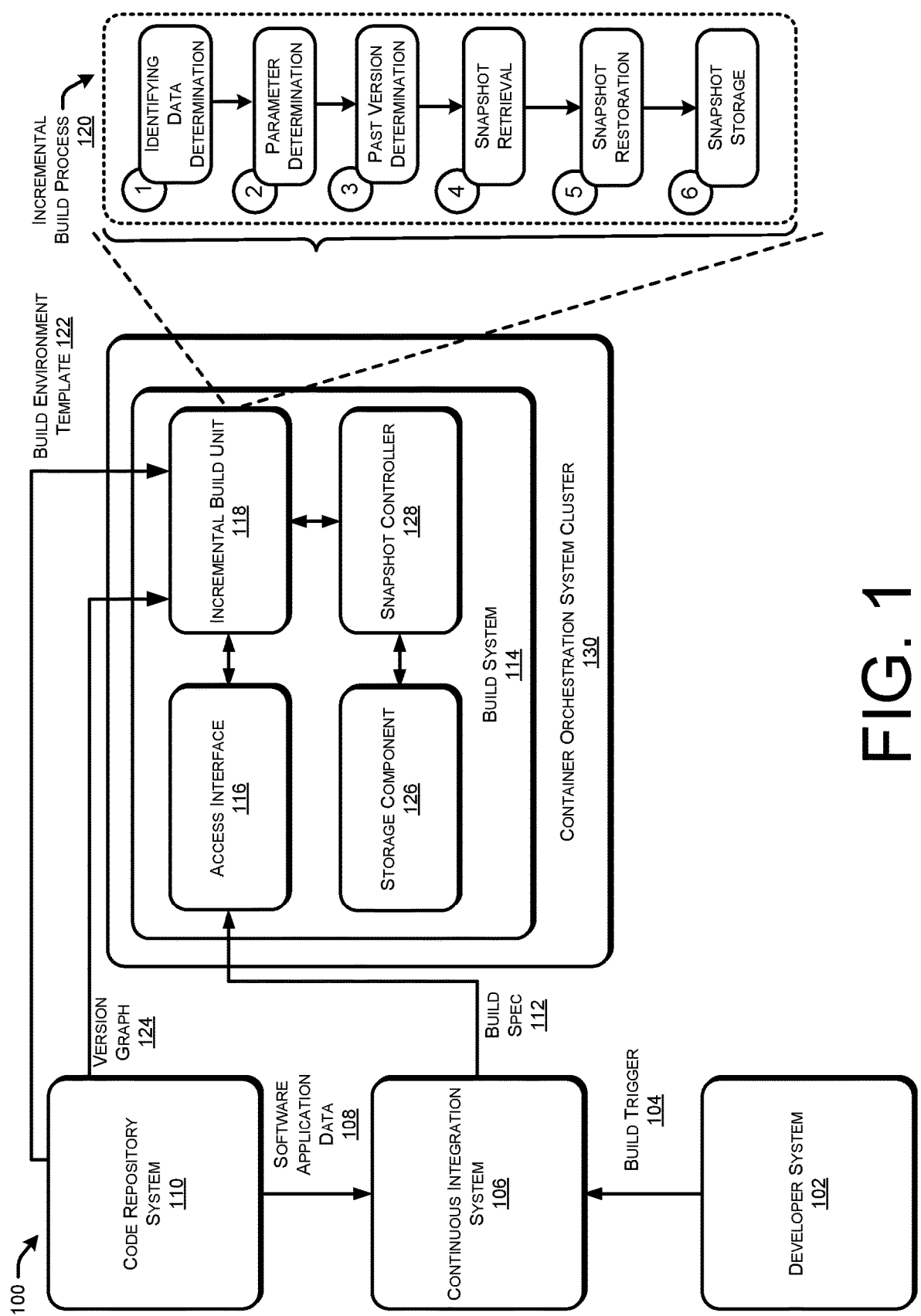
FIG. 1 illustrates a system architecture for incremental build of a target version of a software application.

This disclosure describes techniques for incrementally building a new version of a software application based on a snapshot of a past build for a qualified past version of the same software application. In some aspects, the techniques described herein relate to a method for building a first version of a software application, where the method includes: receiving a first request for generating a first build unit for a first version of the first software application; determining a first environment parameter associated with the first request; receiving a version history graph associated with the first software application; determining, based on the version history graph, a second version of the first software application, wherein the second version is associated with the first environment parameter; determining that a distance measure associated with the first version and the second version is below a threshold, wherein the distance measure is determined based on the version history graph associated with the first software application; determining that the second version is associated with a first snapshot, wherein the first snapshot is associated with a state of a second build unit for the second version after completion of a build operation associated with the second build unit; and generating the first build unit based on the first snapshot.

Additionally, the techniques described herein may be performed by a system and/or device having non-transitory computer-readable media storing computer-executable instructions that, when executed by one or more processors, performs the method described above.

EXAMPLE EMBODIMENTS

This disclosure describes techniques for incrementally building a new version of a software application based on a snapshot of a past build for a qualified past version of the same software application. In some aspects, the techniques described herein relate to a method for building a first version of a software application, where the method includes: receiving a first request for generating a first build unit for a first version of the first software application; determining a first environment parameter associated with the first request; determining a second version of the first software application, wherein: (i) the second version is associated with the first environment parameter and a second build unit, (ii) the second build unit is associated with a first snapshot, (iii) a distance measure associated with the first version and the second version is below a threshold, and (iv) the distance measure is determined based on a version history graph associated with the first software application; and generating the first build unit based on the first snapshot.

In some cases, the techniques described herein include receiving a request to generate a new build unit for a specific version of the software application, determining the environment parameter associated with the request, and using the environment parameter to identify a past version of the software application that is associated with a build unit and a snapshot. If the distance measure between the requested version and the identified past version is below a certain threshold, the new build unit is generated based on the snapshot of the past build.

In some cases, the techniques described herein include incrementally building a new version of a software application based on a snapshot of a past build for a qualified past version of the same software application. In some cases, an example system receives a first request for generating a first build unit for a first version of a first software application. The system may also determine a first environment parameter associated with the first request. The first environment parameter can be any parameter that is relevant to the build process, such as a virtualization container associated with the build process.

In some cases, based on the first environment parameter, the system determines a past version of the software application that is associated with a build unit and a snapshot. The system may determine whether the distance measure between the requested version and the identified past version is below a certain threshold. The distance measure can be any measure of similarity between the two versions, such as the number of code changes or the number of shared dependencies. In some cases, if the distance measure is below the threshold, the system generates the new build unit based on the snapshot of the past build. The snapshot may contain all the relevant information needed to generate the new build, such as the code, dependencies, and build configuration.

In some cases, the first build unit is an execution unit of a container orchestration system, and the execution unit is associated with a build container. The system can store a second snapshot of the first build unit, and can determine a first identifier of the snapshot based on a second identifier of the first software application and a third identifier of the first version. The first identifier can be stored for future reference.

In some cases, it is important to only restore the snapshot of a build pod that is within a threshold graph distance from the target version as indicated by the version history graph because it ensures that the snapshot is a good match for the target version. If the snapshot is too far removed from the target version, it may contain outdated or incompatible code, dependencies, or configuration that could cause issues when generating the new build and/or cause generating the new build too computationally costly. By only restoring snapshots that are close enough to the target version, the incremental build process can be more efficient and reliable, minimizing the risk of errors and reducing the amount of unnecessary computation required to generate the new build.

In some cases, the techniques described herein enable a cloud-native incremental build process because they takes advantage of the cloud infrastructure and the capabilities of containerization and container orchestration systems like Kubernetes. By storing snapshots of past builds in a data storage system like a database or a file system, an example system can quickly retrieve and use the relevant snapshot to generate a new build. This reduces the time and resources needed to build new versions of software applications, making the process more efficient and cost-effective. Additionally, the ability to identify and use past builds that are within a certain distance from the target version, as indicated by the version history graph, further enhances the efficiency of the incremental build process. In some cases, the techniques described herein can use cloud-native technologies to provide a more streamlined and efficient approach to building software applications.

In addition, the system may employ various techniques to optimize the incremental build process and improve the efficiency of the system. For example, the system may use caching techniques to store frequently accessed data and reduce the need to rebuild certain parts of the software application. The system may also use parallelization techniques to distribute the workload across multiple processors or machines and speed up the build process.

Furthermore, the system may provide various options and configurations for the users to customize the build process and fine-tune the performance of the system. For example, the users may be able to adjust the threshold for the distance measure, specify different types of environment parameters, or configure the caching and parallelization settings. The system may also provide feedback and analysis on the build process, such as performance metrics and build logs, to help the users optimize their workflows and troubleshoot any issues.

Moreover, the system may integrate with other tools and platforms commonly used in the software development process, such as version control systems, continuous integration and delivery systems, and container orchestration systems. The integration can enable seamless and automated workflows across different stages of the development process and ensure that the incremental builds are integrated smoothly into the overall software development cycle.

The techniques described herein provide various technical advantages. For example, by generating a new build unit based on a snapshot of a past build, the system can avoid recompiling code that has not changed. This can result in significant time savings, especially for large software applications with many dependencies. Furthermore, because the system only generates a new build unit if a qualified past version is not found, the techniques described herein can reduce the amount of computational resources needed for the build process. This can help prevent resource overuse and keep build costs low. Moreover, the techniques described herein can lead to more stable and reliable builds since it is based on past builds that have already been tested and proven to work. By using a snapshot of a past build as a basis for the new build, the system can ensure that the new build is built on a solid foundation, reducing the risk of errors and inconsistencies. This can improve the overall quality and reliability of the software application.

In some cases, the techniques described herein are designed for cloud-native environments, such as Kubernetes environments, and is centered around the concept of incremental builds. These techniques may be especially relevant for distributed CI systems and enables the creation of new builds based on a snapshot of a past build for a qualifying past version of the same software application. These techniques may be implemented using a generic controller that can be used with any CSI compliant storage provisioners. These techniques may enable efficient and flexible management of build snapshots in cloud-native environments, helping to streamline the build process and increase productivity for developers working in these environments. Overall, the techniques described herein may provide a Kubernetes/ cloud-native centric solution for incremental builds and is well-suited for modern, distributed software development workflows.

In some cases, cloud-native environments, such as Kubernetes environments, the ability to build new versions of applications incrementally can greatly improve the efficiency of the build process, as it reduces the amount of time and resources needed to build the application from scratch. By utilizing a generic controller that is compatible with any CSI-compliant storage provisioners, the techniques described herein enable distributed CI systems to take advantage of this incremental build process, regardless of the specific storage technology used. This can be particularly advantageous for organizations that have a complex software development pipeline and rely on distributed CI systems to build and test their applications.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a system architecture 100 for incremental build of a target version of a software application. The architecture 100 includes a developer system 102, a continuous integration system 106, and a build system 114.

As depicted in FIG. 1, the build system 114 may run inside a container orchestration system cluster 130, such as a Kubernetes cluster. In some cases, a Kubernetes cluster consists of a set of worker machines, called nodes, that run containerized applications and a master machine that manages the worker nodes and the applications deployed on them. The master machine provides a unified application programming interface (API) endpoint for cluster management and can manage multiple clusters simultaneously. Nodes are the workhorses of a Kubernetes cluster and run the applications in containers. Each node runs a container runtime, such as Docker, to manage containers, and a kubelet, which communicates with the master to manage the containers and report back their status. Other components of a Kubernetes cluster include a container image registry, which stores container images, and network and storage components for managing communication between nodes and storage for applications.

As depicted in FIG. 1, the developer system 102 generates and provides a build request 104 to the continuous integration system 106. The developer system 102 may generate the build request 104 based on a user selection or an event emitted by an automated routine. For example, the developer system 102 may generate the build request 104 based on a user selection to build a target version of a software application or an event emitted by the automated routine that indicates satisfaction of a condition for building the target version. As another example, the developer system 102 may generate the build request 104 based on a user selection to trigger a continuous integration pipeline or an event emitted by the automated routine that indicates satisfaction of a condition for triggering the continuous integration pipeline. The developer system 102 may detect a user selection based on a user action performed using a graphical user interface or a command provided using a command line interface.

In some cases, the developer system 102 may generate the build request 104 when the developer system 102 receives a request to build a target version of a software application. For example, the developer system 102 may receive the request to build a version of the software application associated with the latest commit to the code repository system 110. In some cases, the request to build the target version is part of a request to deploy or release the software application. In some cases, the request to build the target version is part of a request to retrieve or pull the target version from the code repository system 110.

The continuous integration system 106 may receive the build request 104 from the developer system 102, receive software application data 108 from the code repository system 110, generate a build specification 112 based on the software application data 108, and provide the build specification 112 to the build system 114. The continuous integration system 106 may be one of Jenkins, GitLab, or CircleeCI.

In some cases, the continuous integration system 106 is configured to receive software application data 108 from the code repository system 110. The software application data 108 may include at least one of an application identifier for the software application, a version identifier for the target version, or an execution unit template for an execution unit (e.g., a Kubernetes pod) of the build system 114 that is configured to build the target version of the software application. In some cases, the application identifier for the software application is a repository identifier (e.g., a repository shasum) for a repository of the code repository system 110 that is associated with the software application. In some cases, the version identifier includes at least one of a commit identifier associated with a code commit corresponding to the target version or a pull request identifier associated with a pull request corresponding to the target version. In some cases, an execution unit template is a pod template for a Kubernetes pod. In some cases, the code repository system 110 is a version control system such as GitHub.

In some cases, the software application data 108 includes a pod template for a Kubernetes pod tasked with performing the build operations corresponding to the build request 104. In some cases, a pod template for a Kubernetes pod is a configuration file that defines the desired state of the pod, which is the smallest deployable unit in a Kubernetes cluster. The pod template may include information such as the container images to be used, the resources required by the containers, and any networking or storage configuration needed to support the containers. In some cases, the pod template includes at least one of the following: (i) metadata such as the name and labels of the pod, which are used to identify and manage the pod within the Kubernetes cluster, (ii) the desired state of the pod, including containers to be deployed, the resources required by each container, any networking or storage configuration needed to support the containers, and ports or environment variables associated with each container, or (iii) any storage volumes to be used by the containers in the pod, along with their type and any configuration needed to support them. The pod template may be a YAML Ain't Markup Language (YAML) file or a JavaScript Object Notation (JSON) file. An operational example of a Kubernetes pod template 500 is provided in FIG. 5.

In some cases, the continuous integration system 106 is configured to generate the build specification 112 and provide the build specification 112 to the build system 114. The build specification may represent one or more features associated with the software application, the target version of the software application, or a continuous integration pipeline configured to trigger the build of the target version. In some cases, the build specification 112 represents a field (e.g., a pipeline identifier) that can be mapped to the software application (e.g., to a code repository associated with the software application) and/or to the target version of the software application (e.g., to a commit identifier associated with a code commit corresponding to the target version).

The build system 114 may receive the build specification 112 and generate a build unit corresponding to the build specification 112. The build system 114 may be a container orchestration system such as a Kubernetes cluster. The build unit may be an execution unit of the build system 114 that is configured to build the target version of the software application. The build unit may include one or more containers (e.g., a compilation container) that is configured to process the source code associated with the target version to generate the executable build file for the target version. In some cases, the build unit is an execution unit of a container orchestration system, such as a Kubernetes pod in a Kubernetes cluster.

In some cases, to generate the build unit corresponding to the build specification 112, an access interface 116 of the build system 114 first receives the build specification 112 and forwards the build specification 112 to an incremental build unit 118 of the build system 114. The incremental build unit 118 may be able to determine the build unit based on the build specification 112, for example by performing the operations of the incremental build process 120. In particular, at operation (1) of the incremental build process 120, the incremental build unit 118 determines identifying data associated with the target version based on the build specification 112. For example, the incremental build unit 118 may retrieve a pipeline identifier from the build specification 112 and map the retrieved pipeline identifier to the identifying data associated with the target version. The identifying data may represent a code repository and/or a code commit of the code repository system 110 that corresponds to the target version.

In some cases, the incremental build unit 118 may use a pipeline identifier described by the build specification 112 to determine identifying data associated with the target version. For example, in some cases, the incremental build unit 118 first retrieves a uniform resource locator (URL) of a corresponding code repository associated with a continuous integration pipeline having the particular identifier. The incremental build unit 118 then retrieves the commit history for the code repository, which may enable viewing the details of each commit associated with the code repository, including the commit hashes and the commit messages. The pipeline identifier can then be used to match against the commit messages and/or other metadata in the commit history to determine the corresponding commit that triggered the pipeline. Once the corresponding commit has been identified, its details, such as author, date, and changes made, can be retrieved from the code repository system 110.

At operation (2) of the incremental build process 120, the incremental build unit 118 determines an environment parameter associated with the build specification 112 based on the identifying data for the target version. In some cases, after determining the identifying data associated with the target version, the incremental build unit 118 retrieves a build environment template 122 associated with the target version from the code repository system 110. The build environment template 122 may represent at least one environment parameter associated with the build specification 112. An environment parameter may represent a feature of a computing environment within which the build operations configured to build the target version should occur. Examples of environment parameters include a cloud environment for executing the build operations, a virtualization container for the build operations, and a configuration profile that the build system 114 should use to perform the build operations. An operational example of a build environment template 600 is provided in FIG. 6.

In some cases, an environment for building a commit using a Kubernetes pod can be defined in GitHub by creating a YAML file that specifies the pod template and any additional configuration needed to run the build. In some cases, specifying the build environment includes specifying any additional configuration needed to run the build, such as specifying the repository and branch to build, any build parameters or arguments, and any post-build actions or notifications. In some cases, the YAML file is integrated into a GitHub Actions template. In some cases, to determine the environment features associated with the build specification 112, the incremental build unit 118 retrieves the GitHub Actions template for the corresponding commit associated with the target version and determines the environment features based on the YAML file within the GitHub Actions template.

At operation (3) of the incremental build process 120, the incremental build unit 118 determines a qualified past version of the software application that can be used to incrementally build the target version. In some cases, the qualified past version of the software application is a past version (e.g., a past commit) that: (i) is associated with an environment parameter of the target version, (ii) is associated with a past build unit whose snapshot is stored on a storage component 126 of the build system 114, and/or (iii) has a distance measure with respect to the target version that is below a distance threshold. In some cases, the qualified past version of the software application is a past version that: (i) has the same set of environment parameters as the current version, (ii) is associated with the same version branch (e.g., GitHub commit branch) as the current version, (iii) is associated with a past build unit whose snapshot is stored on the storage component 126 of the build system 114, and/or (iv) has a distance measure with respect to the target version that is below a distance threshold.

In some cases, the incremental build unit 118 determines the qualified past version based on a version history graph 124 associated with the software application (e.g., associated with a code repository corresponding of the software application). For example, in some cases, the incremental build unit 118 uses the version history graph 124 to retrieve the most recent N past versions associated with the target version (e.g., the most recent N past versions associated with a version branch of the target version). After retrieving the most recent N past versions associated with the target version, the incremental build unit 118 designates the most recent past version that has the same set of environment features as the target version and is associated with a build snapshot stored on the storage component 126 as the qualified past version. In some cases, N is determined based on the distance threshold. For example, if the distance threshold is 51, then N may be 50.

The incremental build unit 118 may receive the version history graph 124 associated with the target version from the code repository system 110 and uses the received version history graph 124 to determine/select the qualified past version. In some cases, the version history graph used to determine the qualified past version is a version history graph of the GitHub code repository. The version history graph in GitHub may be a visual representation of the history of changes to a code repository over time. It shows the different versions of the code, how they relate to each other, and the sequence of changes that led from one version to another. This graph may be represented as a branching tree, where each branch represents a different version of the code, and each node on the branch represents a specific commit. The version history graph in a system like GitHub may be created by the use of version control software, such as Git, which tracks changes to the codebase over time. Each commit may represent a snapshot of the code at a specific point in time, and includes information about the changes made, the author of the changes, and any associated metadata. The version history graph may provide a history of changes to the codebase, which can be used to track issues, revert changes, and collaborate with other developers. The version history graph may provide a way to visualize the evolution of the code over time and to identify patterns and trends in the development process. An operational example of a version history graph 700 is provided in FIG. 7.

In some cases, to determine the qualified past version, the incremental build unit 118 identifies the most recent N past versions associated with the target version (e.g., the most recent N past versions associated with a version branch of the target version). After retrieving the most recent N past versions associated with the target version, the incremental build unit 118 designates the most recent past version that satisfies one or more conditions (e.g., has the same set of environment features as the target version and is associated with a build snapshot stored on the storage component 126) as the qualified past version. In some cases, N is determined based on the distance threshold.

In some cases, to determine the qualified past version, the incremental build unit 118 identifies the most recent past version associated with the software application that satisfies at least one of the following conditions: (i) a condition requiring that the distance measure between the qualified past version and the target version is below a threshold (e.g., a threshold of 51), (ii) a condition requiring that the qualified past version is associated with a past build unit (e.g., a Kubernetes pod associated with building the software application) whose snapshot is stored on the storage component 126, (iii) a condition requiring that the qualified past version and the target version are both associated with a common build environment, or (iv) a condition requiring that the qualified past version is in the same version branch (e.g., commit branch) as the target version. In some cases, if the qualified past version is in the same branch as the target version, the qualified past version is an ancestor of the target version. In some cases, if the qualified past version has a common build environment as the target version, the qualified past version is a common-environment ancestor of the target version.

In some cases, the distance measure between two versions (e.g., two commits) of a software application is a measure of difference between the two versions. For example, if one of the two versions is an ancestor of the other version, then the distance measure may represent the number of hierarchical levels (e.g., generations or levels of ancestry) between the two versions. In some cases, the distance measure between two versions (e.g., two commits) of a software application is a measure of graph distance between nodes associated with the two versions in a version history graph. For example, the distance measure may be a measure of the number of edges between the nodes associated with the two versions in the version history graph.

In some cases, if the incremental build unit 118 determines that the target version is not associated with any qualified past versions, then the incremental build unit 118 generates a build unit (e.g., a build-type Kubernetes pod) for the target version and stores a snapshot of the target version in the storage component 126. In some cases, the incremental build unit 118 stores an identifier of the snapshot that is determined based on an identifier of the software application (e.g., a shasum of the code repository corresponding to the software application), an identifier (e.g., a job name) of the continuous integration pipeline associated with the target version, and/or an identifier of the target version (e.g., a shasum of the commit associated with the target version). For example, the identifier of the snapshot may have the format <identifier of the software application+identifier of the continuous integration pipeline>-<identifier of the target version>.

At operation (4) of the incremental build process 120, the incremental build unit 118 retrieves a snapshot of the past build unit for the qualified past version from the storage component 126. In some cases, to retrieve the snapshot of the past build unit, the incremental build unit 118 requests that a snapshot controller 128 of the build system 114 retrieves the snapshot from the storage component 14. The snapshot controller 128 may be a snapshot controller in a primary node of a container orchestration system such as a Kubernetes cluster. In some cases, to retrieve the snapshot of the past build unit, the snapshot controller 128 retrieves the stored file associated with the identifier of the snapshot from the storage component 126.

At operation (5) of the incremental build process 120, the incremental build unit 118 restores the retrieved snapshot of the past build unit. The restored snapshot may then perform operations configured to build the target version not from a scratch, but based on any differences between the target version and the qualified past version associated with the retrieved snapshot. For example, the snapshot may be configured to execute incremental compilation logic (e.g., using a compiler container), where the incremental compilation logic (e.g., given the existing build files associated with the past build) is configured to build the target version not from a scratch, but based on any differences between the target version and the qualified past version associated with the retrieved snapshot.

At operation (6) of the incremental build process 120, the incremental build unit 118 stores the restored snapshot on the storage component 126 based on (e.g., in response to) determining the end of the build process associated with the target version. In some cases, the incremental build unit 118 stores an identifier of the snapshot that is determined based on an identifier of the software application (e.g., a shasum of the code repository corresponding to the software application), an identifier (e.g., a job name) of the continuous integration pipeline associated with the target version, an identifier of the target version (e.g., a shasum of the commit associated with the target version), and/or a build number or pull request number associated with the snapshot.

For example, in some cases, the identifier of the snapshot may have the format <identifier of the software application+identifier of the continuous integration pipeline>-<identifier of the target version>-<build number>. As another example, in some cases, the identifier of the snapshot may have the format <identifier of the software application+identifier of the continuous integration pipeline>-<identifier of the target version>-<pull request number>.

In some cases, the storage component 126 used to store snapshots of execution units (e.g., build units) stores the snapshots using persistent volume claims (PVCs), where each PVC may be associated with a respective snapshot (e.g., a respective snapshot for a build unit). In a Kubernetes cluster, a PVC may be a request for storage resources that can be used by a pod. PVCs provide a layer of abstraction between storage needs and storage implementation, allowing administrators to provision storage resources without being concerned with the details of the underlying storage infrastructure. PVCs can be used to store data that needs to persist across pod restarts or even across the deletion of a pod. To store snapshots of Kubernetes pods, PVCs can be used in combination with Container Storage Interface (CSI) snapshots. CSI snapshots may enable capture of point-in-time snapshots of the data stored in a PVC. These snapshots can be used for backups, disaster recovery, and testing, among other use cases. In some cases, by using PVCs and CSI snapshots in a Kubernetes cluster, an application can easily store and manage data that needs to persist across pod restarts, and create point-in-time copies of that data for backup and other use cases.

Figure 2:
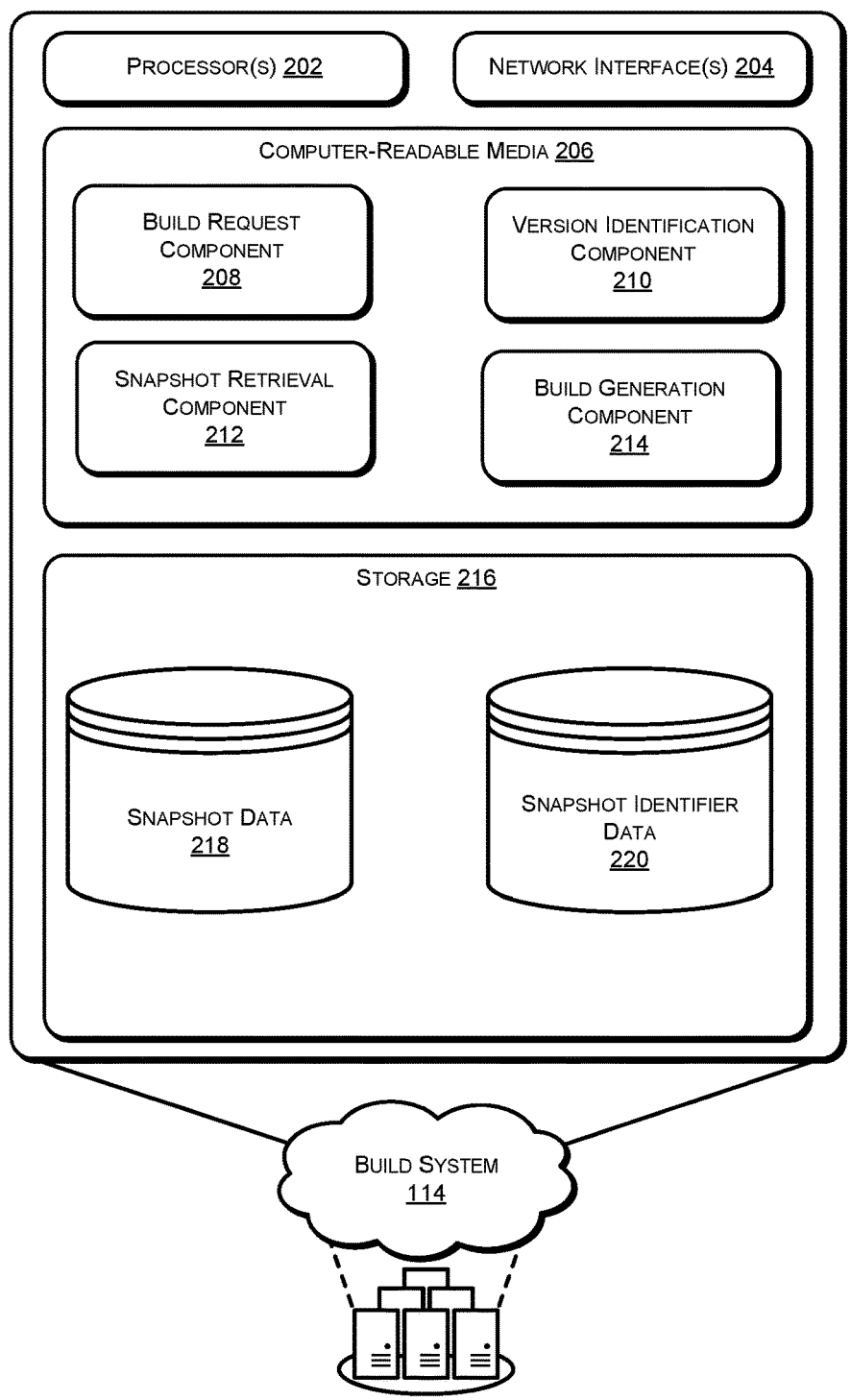
FIG. 2 illustrates a component diagram of the example build system.

FIG. 2 illustrates a component diagram 200 of the example build system 114 of FIG. 1. As depicted in FIG. 1, the build system 114 may include one or more hardware processors 202 (processors), which may be one or more devices configured to execute one or more stored instructions. The processor(s) 202 may comprise one or more cores. Further, the build system 114 may include one or more network interfaces 204 configured to provide communications between the build system 114 and other devices, such as the code repository system 110 and/or the continuous integration system 106. The network interfaces 204 may include devices configured to couple to personal area networks (PANs), wired and wireless local area networks (LANs), wired and wireless wide area networks (WANs), and so forth. For example, the network interfaces 204 may include devices compatible with Ethernet, Wi-Fi™, and so forth.

The build system 114 may also include computer-readable media 206 that stores various executable components (e.g., software-based components, firmware-based components, etc.). The computer-readable media 206 may store components to implement functionality described herein. While not illustrated, the computer-readable media 206 may store one or more operating systems utilized to control the operation of the one or more devices that comprise the build system 114. According to one embodiment, the operating system comprises the LINUX operating system. According to another embodiment, the operating system(s) comprise the WINDOWS® SERVER operating system from MICROSOFT Corporation of Redmond, Washington. According to further embodiments, the operating system(s) can comprise the UNIX operating system or one of its variants. It should be appreciated that other operating systems can also be utilized.

Additionally, the build system 114 may include storage 216 which may comprise one, or multiple, repositories or other storage locations for persistently storing and managing collections of data such as databases, simple files, binary, and/or any other data. The storage 216 may include one or more storage locations that may be managed by one or more storage/database management systems. For example, the storage 216 may store snapshot data 218 including snapshots associated with build units associated with past buildings of software application versions. As another example, the storage 216 may store snapshot identifier data 220 including a snapshot identifier for each stored snapshot.

The computer-readable media 206 may include portions, or components, that configure the build system 114 to perform various operations described herein. For example, a build request component 208 may be configured to receive a request to generate a new build unit for a specific version of the software application and determine an environment parameter associated with the request. As another example, a version identification component 210 may be configured to determine a qualified past version of the software application based on the environment feature. As an additional example, a snapshot retrieval component 212 may be configured to retrieve the snapshot associated with the qualified past version. As a further example, a build generation component 214 may be configured to generate the new build by restoring the retrieved snapshot.

Figure 3:
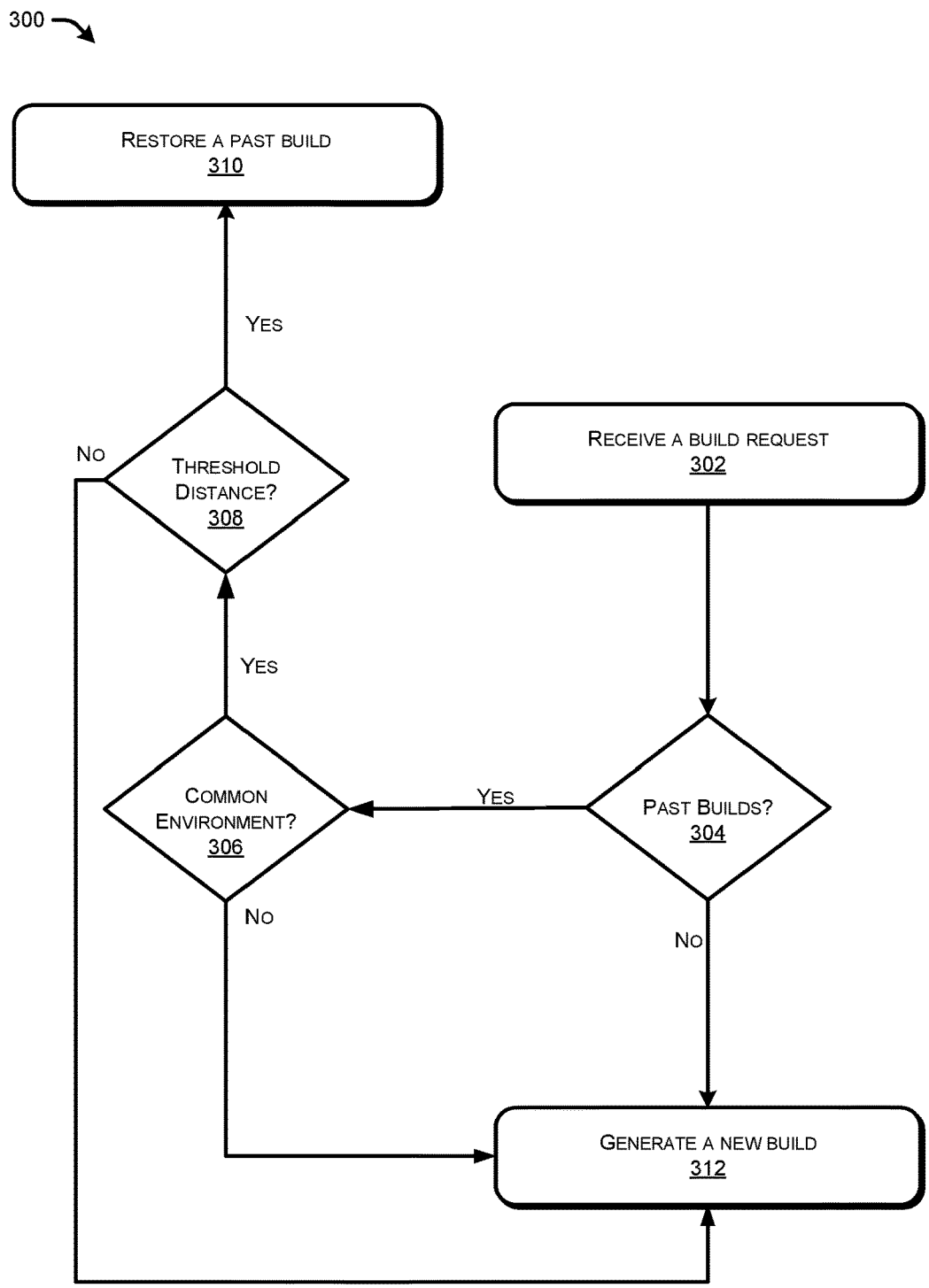
FIG. 3 is a flowchart diagram of an example process for generating a build unit for a target version of a software application based on any past builds associated with the software application.

FIG. 3 is a flowchart diagram of an example process 300 for generating a build unit for a target version of a software application based on any past builds associated with the software application. As depicted in FIG. 3, at operation 302, the process 300 includes receiving a build request. The build request may include a request made to a build system, such as a build server or a continuous integration/continuous deployment (CI/CD) pipeline, to create a new build for the target version of the software application. The build request may include information about the version of the application to be built, such as a version number or a commit hash from a version control system like Git. Additionally, the build request may include information about the environment in which the build should be performed, such as the operating system, the hardware architecture, and the toolchain (e.g., compiler, linker, etc.) to be used. The build request may also specify any additional build configuration parameters or build flags that are necessary for the build process, such as optimization levels or debug symbols.

At operation 304, the process 300 includes determining whether the target version is associated with any past builds. In some cases, the build system may use a version history graph associated with the branch of the target version to identify the last N (e.g., fifty) versions (e.g., commits). In some cases, after identifying the last N versions, the build system determines whether at least one of those N past versions is associated with a stored snapshot of the build unit (e.g., the build Kubernetes pod) associated with the past version. In some cases, if at least one of the last N versions associated with the target version's branch is associated with a stored build unit snapshot, the build system determines that the target version is associated with a past build. In some cases, if none of the last N versions associated with the target version's branch is associated with a stored build unit snapshot, the build system determines that the target version is not associated with a past build.

At operation 306, the process 300 includes determining whether at least one past build associated with the target version is associated with the same build environment as the target version, based on (e.g., in response to) determining that the target version is associated with at least one past build. In some cases, the build system determines that a target version and a past build have the same environment if a set of environment parameters associated with a desired build environment for the target version matches a set of environment parameters associated with the build environment in which the operations associated with the past build were performed.

At operation 308, the process 300 includes determining whether at least one common-environment past build is associated with a past version within a threshold distance of the target version, based on (e.g., in response to) determining that the target version is associated with at least one common-environment past build. In some cases, the distance between two versions is determined based on how proximate the nodes associated with the two versions are in a version history graph. In some cases, the distance between two versions is determined based on the number of edges between the nodes associated with the two versions in a version history graph. In some cases, the distance between two versions is determined based on a weighted number of edges between the nodes associated with the two versions in a version history graph, where the weight of an edge may be determined based on at least one of a build time associated with the incremental build represented by the edge and/or the number of code modifications between the two versions associated with the edge.

At operation 310, the process 300 includes restoring a past build based on (e.g., in response to) determining that the target version is associated with at least one common-ancestor past node whose past version is within a threshold distance of the target version. In some cases, if the target version is associated with one or more qualified past versions, each associated with the target version's branch, a build snapshot, the target version's build environment, and a threshold distance vis-à-vis the target build that is below the threshold distance, then the build system restores the build snapshot of the most recent of the one or more qualified past versions.

At operation 312, the process 300 includes generating a new build from scratch for the target version. In some cases, the process 300 is performed based on (e.g., in response to) determining that: (i) the target version is not associated with any past builds, (ii) none of the past builds associated with the target version has the same build environment as the desired build environment for the target version, or (iii) none of the common-environment past builds associated with the target version is associated with a past version that falls within the threshold distance from the target version.

Figure 4:
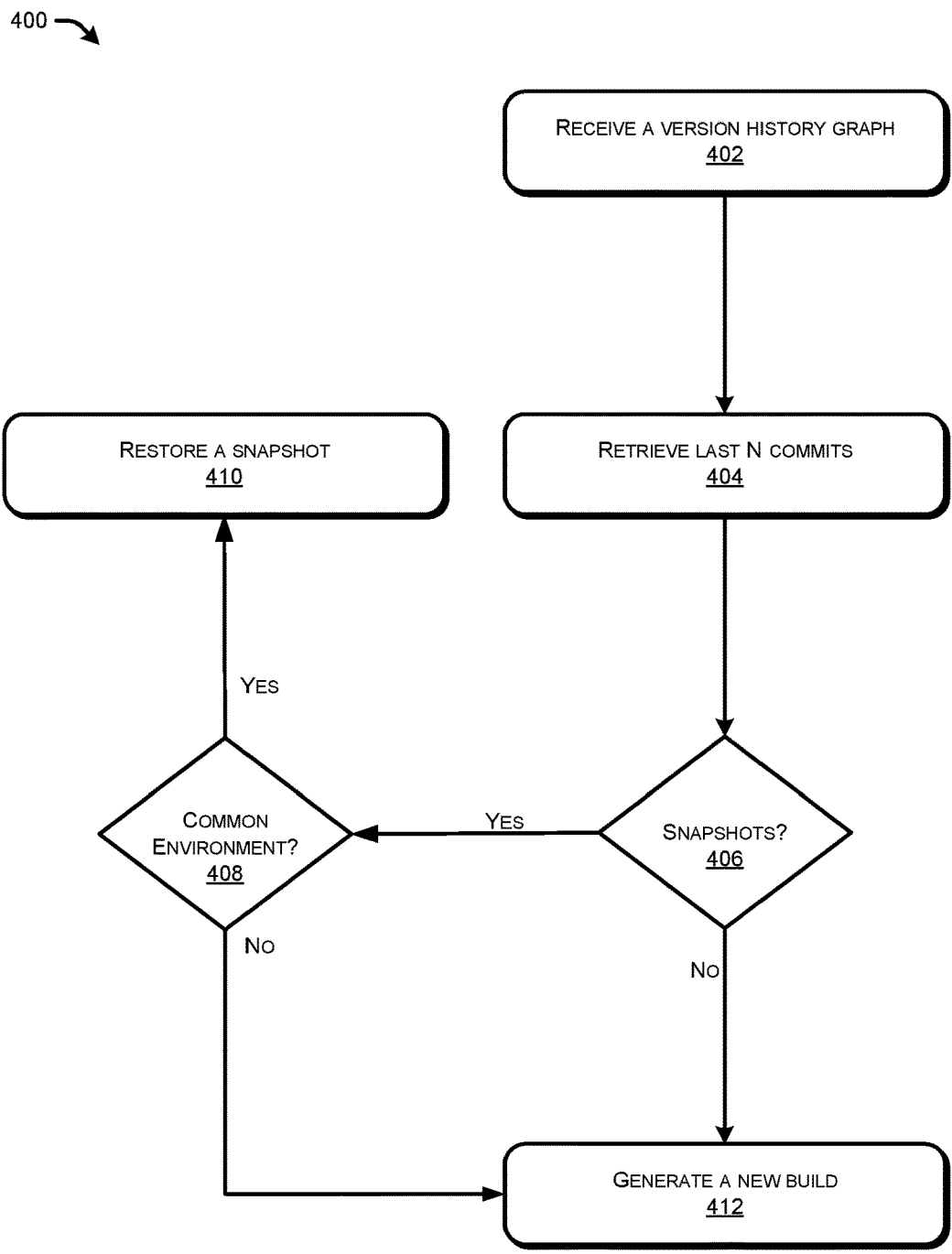
FIG. 4 is a flowchart diagram of an example process for generating a build unit for a current commit of a software application based on a version history graph associated with the software application's code repository.

FIG. 4 is a flowchart diagram of an example process 400 for generating a build unit for a current commit of a software application based on a version history graph associated with the software application's code repository. As depicted in FIG. 4, at operation 402, the process 400 includes receiving a version history graph associated with the software application's code repository.

In some cases, a version history graph is a graphical representation of the evolution of a software project over time. The version history graph may represent different versions of the software and how they relate to each other through various types of relationships, such as parent-child, branch-merge, and tag-based relationships. Each node in the graph may represent a version of the software, while the edges between nodes may represent the relationships between those versions. In some cases, by examining the version history graph, developers can gain insights into how the project has evolved, how different versions relate to each other, and how changes made in one version may affect other versions. This can be useful for debugging, identifying issues, and understanding the overall structure of the software project.

At operation 404, the process 400 includes retrieving the last N commits associated with the current commit's branch. In some cases, the version history graph represents the last N commits associated with the branch of the current commit. In some cases, N is fifty. In some cases, N is a configurable parameter of an incremental build routine.

At operation 406, the process 400 includes determining whether at least one of the N last commits is associated with a build snapshot. A build unit may be an execution unit of an orchestration system that is configured to build a software application version. A build snapshot of a commit may be the snapshot of the state of the build unit associated with the commit after the build unit completes the corresponding build operation.

At operation 408, the process 400 includes determining whether at least one of the N last commits with a build snapshot is associated with a build environment that is the same as the desired build environment of the current commit, based on (e.g., in response to) determining that at least one of the N last commits is associated with a build snapshot. In some cases, the build system determines that a current commit and a past commit are associated with the same environment if a set of environment parameters associated with a desired build environment for the current commit matches a set of environment parameters associated with the build environment in which the operations associated with building the past commit were performed.

At operation 410, the process 400 includes restoring a build unit of one of the N last commits associated with the build snapshot and a common build environment vis-à-vis the current commit. Operation 410 may be performed based on (e.g., in response to) determining that at least one of the N last commits with a build snapshot is associated with a build environment that is the same as the desired build environment of the current commit. In some cases, the build system restores the snapshot associated with the build unit corresponding to the most recent one of the N last commits with a common build environment vis-à-vis the current commit.

At operation 412, the process 400 includes generating the build unit for the current commit from scratch without incremental build. In some cases, operation 412 is performed based on (e.g., in response to) determining that: (i) the version history graph for the current commit does not indicate any past commits for the current commit's branch, (ii) none of the last N commits for the current commit's branch is associated with a build snapshot, or (iii) none of the last N commits for the current branch that are associated with respective build snapshots has the same build environment as the desired build environment of the current commit.

FIG. 5 provides an operational of a Kubernetes pod template 500. As depicted in FIG. 5, the Kubernetes pod template 500 includes metadata specifying the name 502 and labels 504 of the pod, a container specification 506 listing a single container named my-container, and a volume specification 508 defining a persistent volume claim named my-claim. The container specification 506 includes the container image my-image: latest, exposes port 80, and sets an environment variable MY_VAR to the value "my-value".

FIG. 6 provides an operational example of a build environment template 600. In particular, the build environment template 600 defines the build environment features for a Jenkins pipeline agent, which will be run on a Kubernetes cluster using the Kustomize tool.

As depicted in FIG. 6, the build environment template 600 specifies the pipeline agent's configuration, which includes the agent's name 602, storage driver 604, kind 606 of pipeline agent, default container 608, custom workspace directory 610, cloud environment name 612, and Kustomize overlay configuration 614.

As further depicted in the build environment template 600 of FIG. 6, the agent configuration includes Agent1, which specifies the name of the first agent configuration. The snapci section contains a specific driver configuration for the agent, which specifies the storage driver to use, either Rook-Ceph or LVM. The kind section specifies the kind of pipeline agent, which is a Kubernetes agent configured with Kustomize. The defaultContainer section specifies the name of the default container to use for the pipeline agent, and the custom Workspace section specifies the directory in which the pipeline agent will execute. The cloud section specifies the name of the cloud environment in which the pipeline agent is running, in this case, "yahoo". The overlays section specifies the configuration for the Kustomize overlays to be applied to the base configuration. The bases section specifies the base configuration to be used for the Kustomize overlays, and the name section specifies the name of the base configuration to be used. The patches section specifies the patches to be applied to the base configuration, and the name section specifies the name of the patch to be applied, in this case, the "medium" patch.

Figure 7:
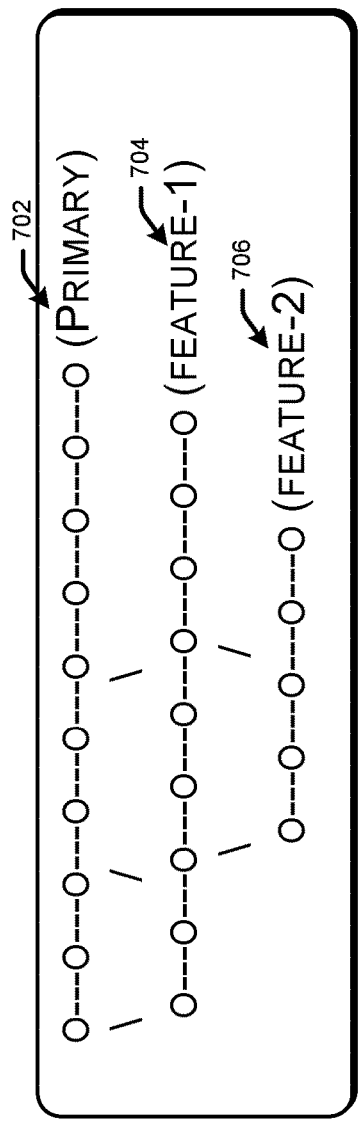
FIG. 7 provides an operational example of a version history graph.

FIG. 7 provides an operational example of a version history graph 700. As depicted in FIG. 7, the version history graph 700 shows three commit branches: primary 702, feature-1 704, and feature-2 706. Each circle represents a commit, and the lines connecting the circles represent the relationship between the commits. The primary branch 702 has ten commits, while the feature-1 and feature-2 branches 704, 706 have eight and five commits respectively. The graph shows that feature-1 and feature-2 branches 704, 706 were created from the primary branch 702, and that changes were made to each branch independently before they were merged back into primary branch 702.

Figure 8:
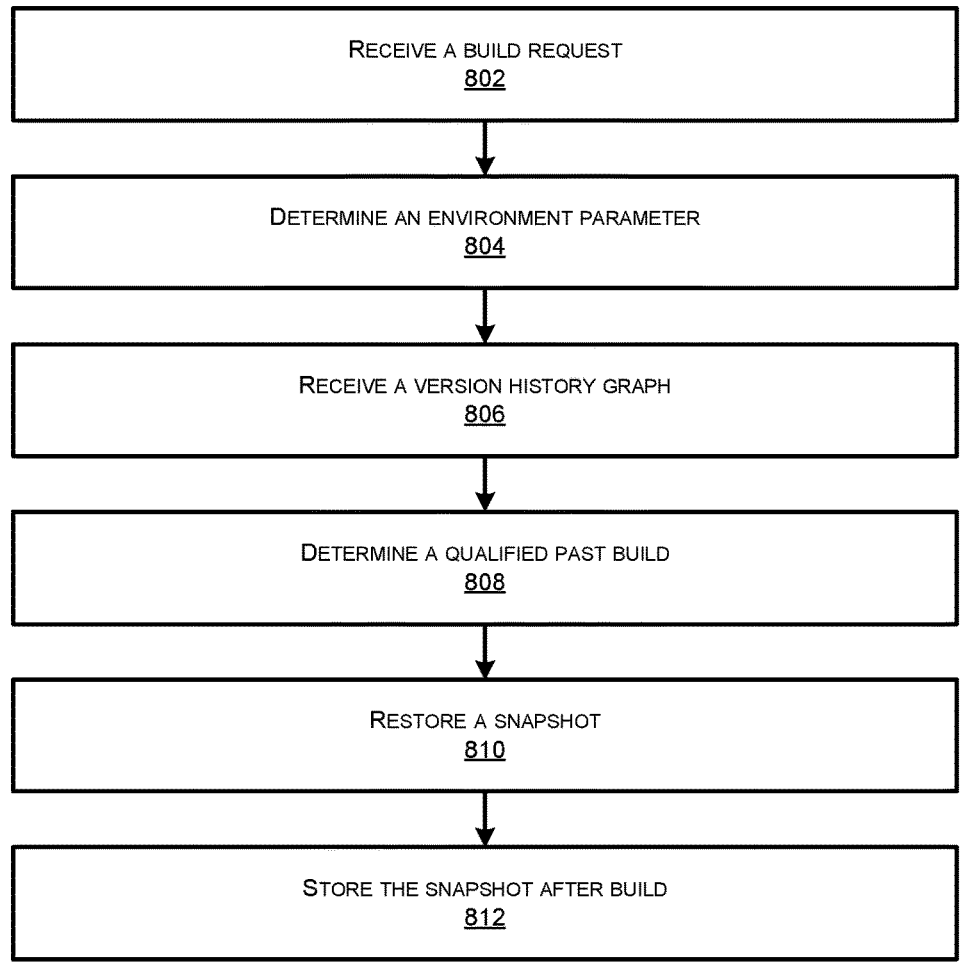
FIG. 8 is a flowchart diagram of an example process for the incremental build of a first version of a first software application.

FIG. 8 is a flowchart diagram of an example process 800 for the incremental build of a first version of a first software application. As depicted in FIG. 8, at operation 802, the process 800 includes receiving a build request. The build request may be a request for building the first version. The build request may represent at least one of a version identifier for the first version, an application identifier for the first software application, or an environment parameter associated with a build environment selected for building the first version.

At operation 804, the process 800 includes determining first environment parameter associated with the build request. The first environment parameter may represent a feature of a selected build environment for building the first version. The first environment parameter may be determined based on the data in the build request, data received from a code repository system, and/or data received from a continuous integration system.

In some cases, the first environment parameter includes an indication of a virtualization container associated with the first request. In some cases, the first environment parameter includes an indication of a cloud storage framework associated with the first request. In some cases, the first environment parameter includes an indication of a configuration profile for a build system (e.g., a Kubernetes cluster) associated with the first request.

Environment parameters for a build environment may include the name and configuration of the pipeline agent, such as the kind of agent (e.g., Kubernetes agent with Kustomize), the name of the default container to use, and the custom workspace directory in which the pipeline agent will execute. The build environment may also specify a cloud environment in which the pipeline agent is running, such as AWS or Google Cloud. Additionally, the build environment may include overlays for Kustomize, which specify the base configuration to be used and the patches to be applied to the base configuration. Other possible environment parameters may include the storage driver to use (e.g., Rook-Ceph or LVM) and any necessary authentication credentials.

At operation 806, the process 800 includes receiving a version history graph associated with the first software application. In some cases, the version history graph represents the history of changes to a software codebase over time. In some cases, the version history graph shows the relationships between different versions of the codebase and the branching and merging of the codebase over time. Each point on the graph may represent a specific version of the codebase, with lines connecting them indicating the changes between each version. The version history graph may be a useful tool for understanding the evolution of a codebase and can help developers track down bugs, conflicts, and other issues that may arise during the software development process.

At operation 808, the process 800 includes determining a qualified past version that satisfies a set of conditions. In some cases, the set of conditions at least one of the following conditions: (i) a condition requiring that the distance measure between the qualified past version and the first version is below a threshold (e.g., a threshold of 51), (ii) a condition requiring that the qualified past version is associated with a past build unit (e.g., a Kubernetes pod associated with building the software application) whose snapshot is stored on the storage component 126, (iii) a condition requiring that the qualified past version and the first version are both associated with a common build environment, or (iv) a condition requiring that the qualified past version is in the same version branch (e.g., commit branch) as the first version.

In some cases, the set of conditions at least one of the following conditions: (i) a condition requiring that the distance measure between the qualified past version and the first version is below a threshold (e.g., a threshold of 51), (ii) a condition requiring that the qualified past version is associated with a past build unit (e.g., a Kubernetes pod associated with building the software application) whose snapshot is stored on the storage component 126, (iii) a condition requiring that the qualified past version and the first version are both associated with a common build environment, (iv) a condition requiring that the qualified past version is in the same version branch (e.g., commit branch) as the first version, and (v) a condition requiring that the qualified past version is the most recent version of all of the versions that satisfy the first four conditions.

In some cases, if the qualified past version is in the same branch as the first version, the qualified past version is an ancestor of the first version. In some cases, if the qualified past version has a common build environment as the first version, the qualified past version is a common-environment ancestor of the first version.

At operation 810, the process 800 includes restoring a snapshot associated with a past build unit that was configured to build the past qualified version. The snapshot may represent the state of the past build unit at a particular point in time, such as at the end of the build operation. The snapshot may include the configuration, code, and dependencies needed to recreate the captured state and its respective build environment.

At operation 812, the process 800 includes storing the snapshot associated with the restored snapshot after the resulting build unit finishes the build of the first version. In some cases, the restored snapshot of a build unit contains all the relevant information needed to generate a new build of the same or similar version of the software application, such as the code, dependencies, and build configuration. By using the snapshot as a starting point, the build system can avoid repeating the time-consuming steps of downloading dependencies, setting up the build environment, and compiling the code. Instead, it can build only the code changes and apply them to the existing snapshot. This approach saves time and computational resources, enabling faster and more efficient build processes. Therefore, the snapshot of a build unit is an important component that enables incremental build in a cloud-native environment.

Figure 9:
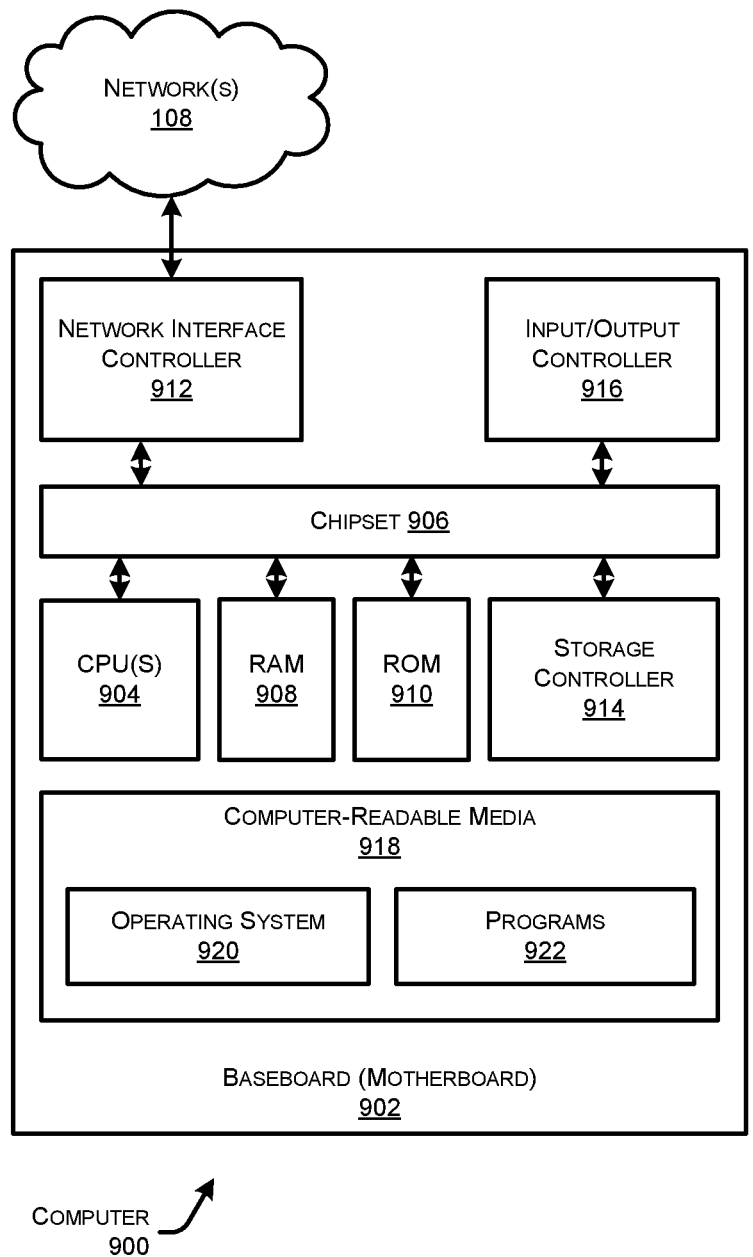
FIG. 9 shows an example computer architecture for a computer capable of executing program components for implementing the functionality described above.

FIG. 9 shows an example computer architecture for a computer 900 capable of executing program components for implementing the functionality described above. The computer architecture shown in FIG. 9 illustrates a conventional server computer, workstation, desktop computer, laptop, tablet, network appliance, e-reader, smartphone, or other computing device, and can be utilized to execute any of the software components presented herein. The computer 900 may, in some examples, correspond to a physical server that is included in the build system 114 described herein, and may comprise networked devices such as servers, switches, routers, hubs, bridges, gateways, modems, repeaters, access points, etc.

The computer 900 includes a baseboard 902, or "motherboard," which is a printed circuit board to which a multitude of components or devices can be connected by way of a system bus or other electrical communication paths. In one illustrative configuration, one or more central processing units ("CPUs") 904 operate in conjunction with a chipset 906. The CPUs 904 can be standard programmable processors that perform arithmetic and logical operations necessary for the operation of the computer 900.

The CPUs 904 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 906 provides an interface between the CPUs 904 and the remainder of the components and devices on the baseboard 902. The chipset 906 can provide an interface to a RAM 908, used as the main memory in the computer 900. The chipset 906 can further provide an interface to a computer-readable storage medium such as a read-only memory ("ROM") 910 or non-volatile RAM ("NVRAM") for storing basic routines that help to startup the computer 900 and to transfer information between the various components and devices. The ROM 910 or NVRAM can also store other software components necessary for the operation of the computer 900 in accordance with the configurations described herein.

The computer 900 can operate in a networked environment using logical connections to remote computing devices and computer systems through a network. The chipset 906 can include functionality for providing network connectivity through a NIC 912, such as a gigabit Ethernet adapter. The NIC 912 is capable of connecting the computer 900 to other computing devices over the network. It should be appreciated that multiple NICs 912 can be present in the computer 900, connecting the computer to other types of networks and remote computer systems.

The computer 900 can be connected to a storage device 918 that provides non-volatile storage for the computer. The storage device 918 can store an operating system 920, programs 922, and data, which have been described in greater detail herein. The storage device 918 can be connected to the computer 900 through a storage controller 914 connected to the chipset 906. The storage device 918 can consist of one or more physical storage units. The storage controller 914 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 900 can store data on the storage device 918 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 918 is characterized as primary or secondary storage, and the like.

For example, the computer 900 can store information to the storage device 918 by issuing instructions through the storage controller 914 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 900 can further read information from the storage device 918 by detecting the physical states or characteristics of one or more locations within the physical storage units.

In addition to the mass storage device 918 described above, the computer 900 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 900. In some examples, the operations are performed by devices in a distributed application architecture, and or any components included therein, may be supported by one or more devices similar to computer 900. Stated otherwise, some or all of the operations performed by the build system 114, and or any components included therein, may be performed by one or more computer devices 900 operating in any system or arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 918 can store an operating system 920 utilized to control the operation of the computer 900. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 918 can store other system or application programs and data utilized by the computer 900.

In one embodiment, the storage device 918 or other computer-readable storage media is encoded with computer-executable instructions which, when loaded into the computer 900, transform the computer from a general-purpose computing system into a special-purpose computer capable of implementing the embodiments described herein. These computer-executable instructions transform the computer 900 by specifying how the CPUs 904 transition between states, as described above. According to one embodiment, the computer 900 has access to computer-readable storage media storing computer-executable instructions which, when executed by the computer 900, perform the various processes described above with regard to FIGS. 1-8. The computer 900 can also include computer-readable storage media having instructions stored thereupon for performing any of the other computer-implemented operations described herein.

The computer 900 can also include one or more input/output controllers 916 for receiving and processing input from a number of input devices, such as a keyboard, a mouse, a touchpad, a touch screen, an electronic stylus, or other type of input device. Similarly, an input/output controller 916 can provide output to a display, such as a computer monitor, a flat-panel display, a digital projector, a printer, or other type of output device. It will be appreciated that the computer 900 might not include all of the components shown in FIG. 9, can include other components that are not explicitly shown in FIG. 9, or might utilize an architecture completely different than that shown in FIG. 9.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:
receiving a first request for generating a first build unit for a first version of a first software application, the first build unit being associated with building the first version in a first build environment, and the first build environment being characterized by a first environment parameter;
receiving a version history graph associated with the first software application;
determining, based on the version history graph and a difference between a first number of dependencies associated with the first version and a second number of dependencies associated with a second version of the first software application, a distance measure between the first version and the second version of the first software application;
determining that the distance measure is below a threshold;
determining that the second version was built by a second build unit in a second build environment characterized by the first environment parameter;
determining that the second build unit is associated with a first snapshot, wherein the first snapshot represents a state of the second build unit for the second version after completion of a build operation associated with building the second version in the second build environment; and
based on determining that the distance measure is below the threshold and that the second version was built in the second build environment characterized by the first environment parameter, generating the first build unit based on the first snapshot, wherein the first build unit enables generating an executable file associated with the first version.

2. The method of claim 1, wherein the first environment parameter comprises an indication of a virtualization container associated with the first request.

3. The method of claim 1, wherein the first environment parameter comprises an indication of a cloud storage framework associated with the first request.

4. The method of claim 1, wherein the first environment parameter comprises an indication of a configuration profile for a build system associated with the first request.

5. The method of claim 1, wherein determining the second version comprises:
determining a plurality of past versions associated with the first version, wherein each past version is associated with a respective distance measure with respect to the first version that is below the threshold; and
determining the second version based on the plurality of past versions.

6. The method of claim 5, wherein determining the second version comprises:
determining a first subset of the plurality of past versions, wherein each past version in the first subset is associated with a respective build that is associated with a respective snapshot; and
determining the second version based on the first subset.

7. The method of claim 5, wherein the plurality of past versions are associated with a software branch of the first version.

8. The method of claim 1, wherein:
the first build unit is an execution unit of a container orchestration system, and
the execution unit is associated with a build container.

9. The method of claim 1, further comprising storing a second snapshot of the first build unit.

10. The method of claim 1, further comprising:
determining a first identifier of the first snapshot based on a second identifier of the first software application and a third identifier of the first version; and
storing the first identifier.

11. A system comprising:
one or more processors; and
one or more non-transitory computer-readable media storing computer-executable instructions that, when executed by the one or more processors, cause the one or more processors to perform operations comprising:
receiving a first request for generating a first build unit for a first version of a first software application, the first build unit being associated with building the first version in a first build environment, and the first build environment being characterized by a first environment parameter;

receiving a version history graph associated with the first software application;

determining, based on the version history graph and a difference between a first number of dependencies associated with the first version and a second number of dependencies associated with a second version of the first software application, a distance measure between the first version and the second version of the first software application;

determining that the distance measure is below a threshold;

determining that the second version was built by a second build unit in a second build environment characterized by the first environment parameter;

determining that the second build unit is associated with a first snapshot, wherein the first snapshot represents a state of the second build unit for the second version after completion of a build operation associated with building the second version in the second build environment; and based on determining that the distance measure is below the threshold and that the second version was built in the second build environment characterized by the first environment parameter, generating the first build unit based on the first snapshot, wherein the first build unit enables generating an executable file associated with the first version.

12. The system of claim 11, wherein the first environment parameter comprises an indication of a virtualization container associated with the first request.

13. The system of claim 11, wherein the first environment parameter comprises an indication of a cloud storage framework associated with the first request.

14. The system of claim 11, wherein the first environment parameter comprises an indication of a configuration profile for a build system associated with the first request.

15. The system of claim 11, wherein determining the second version comprises:

determining a plurality of past versions associated with the first version, wherein each past version is associated with a respective distance measure with respect to the first version that is below the threshold; and determining the second version based on the plurality of past versions.

16. One or more non-transitory computer-readable media storing computer-executable instructions that, when executed by one or more processors, cause the one or more processors to perform operations comprising:

receiving a first request for generating a first build unit for a first version of a first software application, the first build unit being associated with building the first version in a first build environment, and the first build environment being characterized by a first environment parameter;

receiving a version history graph associated with the first software application;

determining, based on the version history graph and a difference between a first number of dependencies associated with the first version and a second number of dependencies associated with a second version of the first software application, a distance measure between the first version and the second version of the first software application;

determining that the distance measure is below a threshold;

determining that the second version was built by a second build unit in a second build environment characterized by the first environment parameter;

determining that the second build unit is associated with a first snapshot, wherein the first snapshot represents a state of the second build unit for the second version after completion of a build operation associated with building the second version in the second build environment; and based on determining that the distance measure is below the threshold and that the second version was built in the second build environment characterized by the first environment parameter, generating the first build unit based on the first snapshot, wherein the first build unit enables generating an executable file associated with the first version.

17. The one or more non-transitory computer-readable media of claim 16, wherein the first environment parameter comprises an indication of a virtualization container associated with the first request.

18. The one or more non-transitory computer-readable media of claim 16, wherein the first environment parameter comprises an indication of a cloud storage framework associated with the first request.

19. The one or more non-transitory computer-readable media of claim 16, wherein the first environment parameter comprises an indication of a configuration profile for a build system associated with the first request.

20. The one or more non-transitory computer-readable media of claim 16, wherein determining the second version comprises:

determining a plurality of past versions associated with the first version, wherein each past version is associated with a respective distance measure with respect to the first version that is below the threshold; and determining the second version based on the plurality of past versions.

* * * * *